W. L. COUTURE.
SPIRIT LEVEL.
APPLICATION FILED MAR. 3, 1908.
901,953.
Patented Oct. 27, 1908.
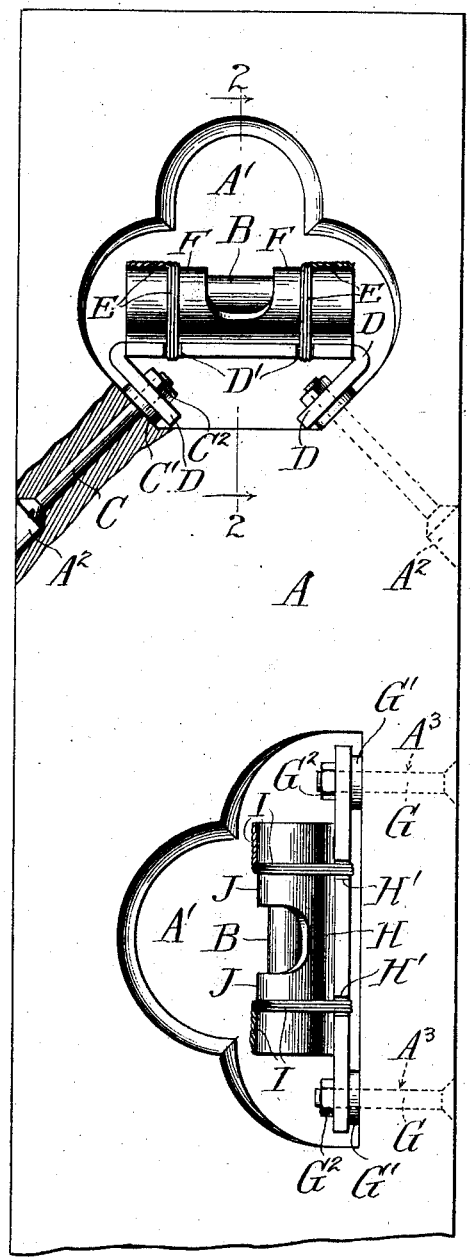
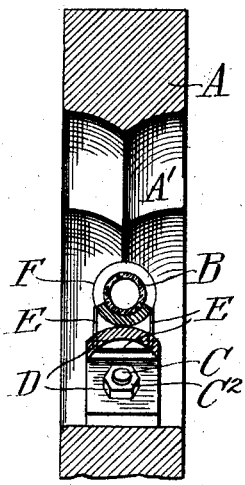
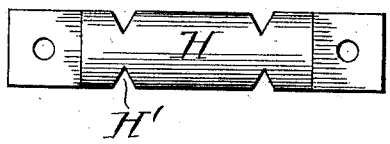
Witnesses
Harry R. L. White
R. A. White
Inventor
William L. Couture
By Morgan & Rubinstein
Atty

UNITED STATES PATENT OFFICE.

WILLIAM L. COUTURE, OF SAN FRANCISCO, CALIFORNIA.

SPIRIT-LEVEL.

No. 901,953.

Specification of Letters Patent.

Patented Oct. 27, 1908.

Application filed March 3, 1908. Serial No. 419,052.

*To all whom it may concern:*

Be it known that I, WILLIAM L. COUTURE, a citizen of the United States, residing at 116 California avenue, in the city of San Francisco, county of San Francisco, State of California, have invented a new and useful Improvement in Spirit-Levels, of which the following is a specification.

The object of my invention is to so place and secure the ordinary glass tube in the supporting body as to prevent the breakage by the jar of said body when thrown or dropped from the hand of the user, and to provide for the easy removal and insertion of said glass, in said body, and its accurate adjustment therein, a most desirable instrument for the use of mechanics.

The manner in which I accomplish my object is described in the following specification and illustrated in the accompanying drawings in which:—

Figure 1, is a side elevation of the supporting body showing the level secured therein in two positions, one for vertical and the other for horizontal leveling; Fig. 2, is a transverse sectional view on the line 2—2 Fig. 1; Fig. 3, represents a plate on which the glass tube is secured.

In the drawings A, is the main body or straight edge in which the glass tube B, is mounted in the apertures A¹. In one of these apertures are two screw bolt holes, A², which extend diagonally through the body A, as shown in Fig. 1. Extending through each of these screw bolt holes is a screw bolt C, each of these screws is provided with a soft rubber washer C¹, and a nut C².

Resting upon the washers C¹, and secured on the bolts C, is a bracket D, having notches D¹. Secured to the face of this bracket by the tie wire E, is a soft rubber tube F, and inside this is the glass spirit tube B.

The center part of the rubber tube F, is cut away sufficient to allow the center part of the glass tube to be seen. In the other aperture A¹, are two screw bolt apertures A³, extending through the body A, at right angles to its length. Extending through each of these apertures is a screw bolt G, each of these screws is provided with a soft rubber washer G¹, and G². Resting on these rubber washers and secured on the bolts G, is a plate H, having notches H¹. Secured to the face of this plate by the tie wires I, is a soft rubber tube J. Inside this tube is a glass spirit tube B, the center part of the rubber tube is cut away sufficient to allow the glass tube to be seen.

When the level is constructed as described and the spirit tube in place in the body, the adjustment of the tube for perfect leveling can be accomplished by a screw driver by which the screw bolts C, and G, can be operated and the plates D, and H, be drawn at either end upon the rubber washers which will yield under pressure sufficient to allow of the adjustment of the spirit tube to the vertical and horizontal levels. And it is obvious that the glass tube can only be broken by a blow on the small part exposed to view, and that concussion and jar will not affect it.

What I claim and desire to secure by Letters Patent is:

1. In a level of the kind described having a main body with apertures therein, the combination consisting of an adjustable supporting plate in each of said apertures, screw bolts extending through said body and plate, nuts on said bolts in contact with said plate, elastic washers on said bolts intermediate of said plate and main body; an elastic tube secured to said plate, means for securing said tube on said plate, and a glass tube secured within said elastic tube as described.

2. In a level of the kind described having a main body with an aperture therein; the combination consisting of a plate within said aperture; screws through said body and plate; an elastic body intermediate of said main body and said plate; a hollow elastic member secured on said plate; means adapted to secure said member on said plate; a spirit glass partly inclosed and secured in said elastic member as described.

3. In a level of the kind described, the combination with the main body having an aperture, of a plate supported in said aperture, elastic members intermediate of said plate and body; means for securing said plate on said members in said aperture; an elastic hollow member secured on said plate means for securing said member and a spirit glass supported within said elastic member as described.

4. In a level of the kind described, the combination with a main body having a plurality of apertures; of a plate in each of said apertures; elastic members intermediate of said plates and body; means for securing said plates and members in said apertures an elastic hollow member secured on each of said plates; means adapted to secure said members to said plates; and a spirit glass supported in each of said hollow members as described.

5. In a level of the kind described, the combination with the main body, a plate supported therein; of elastic cushions intermediate of said plate and body; means for securing said cushions and said plate on said body; a hollow elastic member secured on said plate and a spirit glass secured within said hollow member as described.

6. In a level of the kind described, the combination with the main body; a plate elastically supported therein; of a hollow elastic member secured on said plate, and a spirit glass secured within said hollow member as described.

7. In a level of the kind described, consisting of a main body, a plate elastically secured therein; and a hollow elastic member secured on said plate; the combination with said hollow member of a spirit glass supported therein as described.

WILLIAM L. COUTURE.

Witnesses:
    JOHN C. JOOST,
    WILLIAM A. BRACE.